Figure 1:
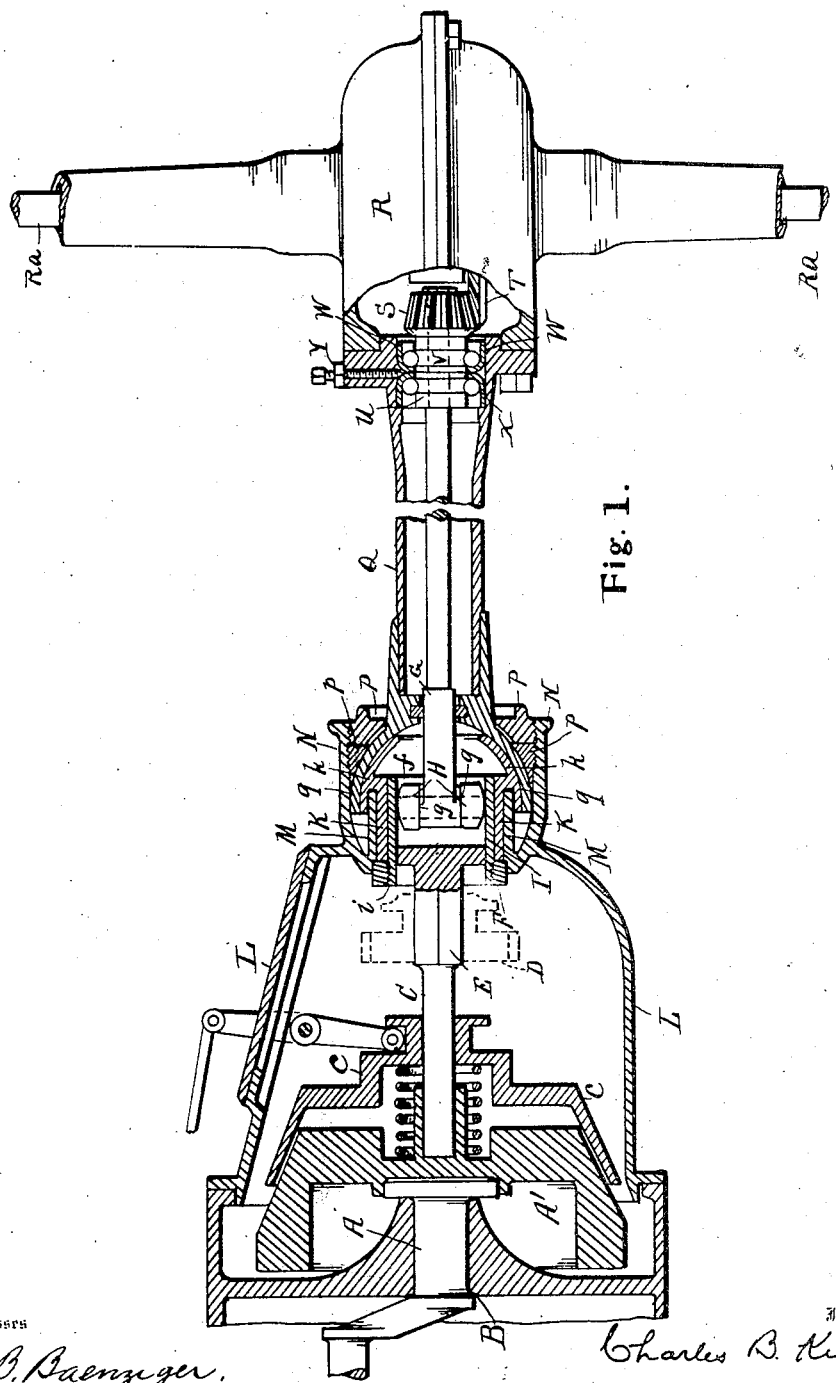

C. B. KING.
TRANSMISSION MECHANISM FOR AUTOMOBILES.
APPLICATION FILED JULY 21, 1910.

1,101,855.

Patented June 30, 1914.
2 SHEETS—SHEET 1.

Witnesses
O. B. Baenziger.
Lotta Lee Bray.

Inventor
Charles B. King
By Parker & Burton
Attorneys

C. B. KING.
TRANSMISSION MECHANISM FOR AUTOMOBILES.
APPLICATION FILED JULY 21, 1910.
1,101,855.
Patented June 30, 1914.
2 SHEETS—SHEET 2.
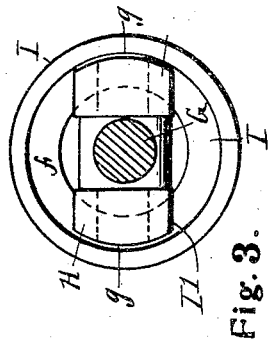
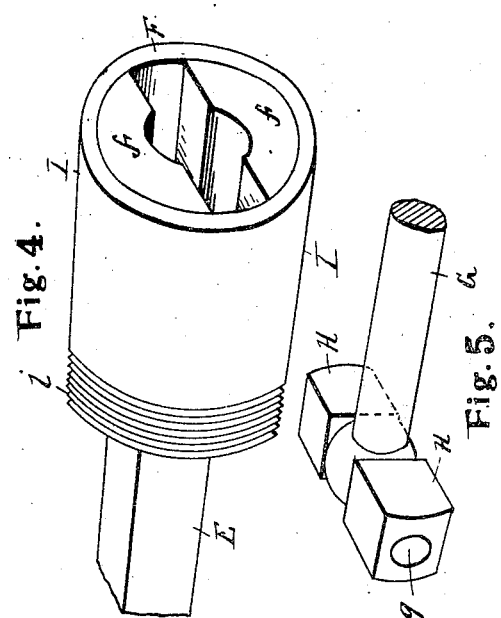
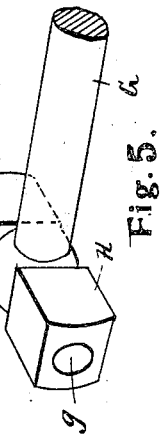
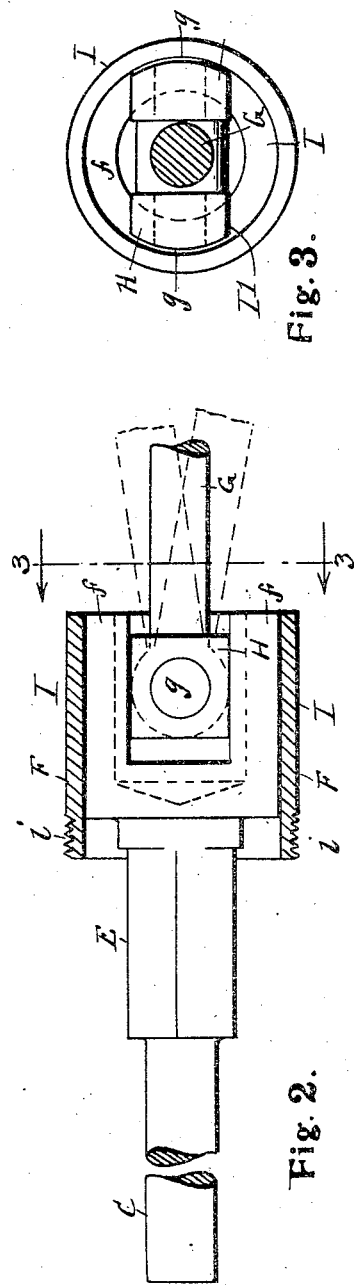
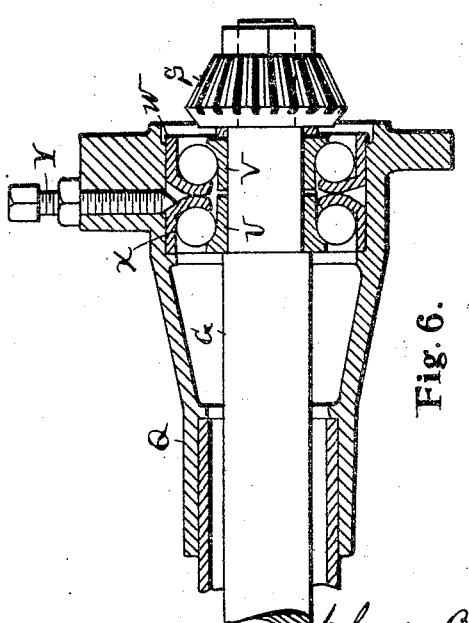

UNITED STATES PATENT OFFICE.

CHARLES B. KING, OF DETROIT, MICHIGAN, ASSIGNOR, BY MESNE ASSIGNMENTS, TO KING MOTOR CAR COMPANY, A CORPORATION OF MICHIGAN.

TRANSMISSION MECHANISM FOR AUTOMOBILES.

1,101,855.

Specification of Letters Patent.  Patented June 30, 1914.

Application filed July 21, 1910. Serial No. 572,954.

*To all whom it may concern:*

Be it known that I, CHARLES B. KING, a citizen of the United States, residing at Detroit, county of Wayne, State of Michigan, have invented a certain new and useful Improvement in Transmission Mechanism for Automobiles, and declare the following to be a full, clear, and exact description of the same, such as will enable others skilled in the art to which it pertains to make and use the same, reference being had to the accompanying drawings, which form a part of this specification.

My invention relates to transmission mechanism for automobiles, and the object of my improvements is to provide an improved transmission mechanism and one that is compact and easily assembled. I accomplish this object in the apparatus illustrated in the accompanying drawings, in which,—

Figure 1, is a sectional plan view of a mechanism embodying my invention, and so much of an automobile as is necessary to illustrate its connection therewith. Fig. 2, is a view of the main shaft of the change speed gear, the sleeve encircling its end being in section. Fig. 3, is a sectional elevation taken on the line 3—3 of Fig. 2, looking in the direction of the arrows, but showing the sleeve in full. Fig. 4, is a perspective view of the end of the main shaft of the change speed gear. Fig. 5, is a perspective view of the end of the transmission shaft which engages the end of the main shaft of the change speed gear. Fig. 6, is a sectional plan view of the bearing at the end of the transmission shaft which is adjacent to the rear axle of the vehicle.

A, is the main shaft of the engine and A¹, is the fly-wheel thereon.

B, is a bearing for the main shaft A.

C, is the main shaft of the change speed gear.

c represents the clutch by which the shaft C may be engaged and disengaged from the main shaft A of the engine.

E, indicates the squared portion toward the end of the shaft C on which one of the wheels of the change speed gear (indicated in dotted lines) may slide. At the end and adjacent to the squared portion E of the shaft C, said shaft is formed into forks *f, f*, the outer surfaces of which are formed in arcs of a circle concentric with the shaft C.

I, is a sleeve having cylindrical outer and inner surfaces firmly fixed upon the outer surface of the forks *f, f*. The inner surfaces of the forks *f, f*, are formed in plane parallel surfaces for some distance from their outer edges and are preferably concave at their centers, as shown most distinctly in Fig. 4.

G, is the transmission shaft, this is provided with two trunnions *g, g*, extending at right angles thereto and upon these trunnions are rotatably fixed squared blocks H, H, which blocks fit between the forks *f, f*, their surfaces contacting the inner parallel surfaces of said forks so as to slidably engage the same. The outer ends of the trunnions *g, g*, and blocks H, H, are formed in the arcs of a circle to correspond to the inner surfaces of the sleeve I to which surfaces they are adjacent when the mechanism is assembled. The construction just disclosed forms a universal joint, the end of the shaft G being held in relative position to that of the shaft E by the forks *f, f*, and the surrounding sleeve I.

L, is the change speed gear case which is fixed to the frame or chassis of the vehicle.

M, is a cylindrical bearing on said gear case having its axis coincident with the axis of the shaft C.

N, is a cylindrical portion of the gear casing L coaxial with M, having an end opening toward the rear axle of the vehicle and having its inner surface adjacent to its open end screw threaded.

K, is a sleeve fitted upon the sleeve I and provided at its ends toward the rear axle with a portion having an outer surface constituting the zone of a sphere, whose center is upon the axis of the shaft C.

Q, is a casing surrounding the transmission shaft G and having at its end remote from the rear axle of the vehicle a portion *q* having an inner surface corresponding to that of the part K and fitting thereagainst. The outer surfaces of the portion *q* is also formed in the zone of the surfaces of a sphere having its center coincident with that of its inner surface and with that of the outer surface of the portion K.

*p*, is an annulus or spherical retaining collar having a cross section adapted to fill the space between the outer surface of the portion *q* and the inner cylindrical surface of the cylindrical portion N of the change speed gear case L. The inner surfaces of the annulus $p$ fits against the outer surfaces of the portion $q$ of the transmission shaft casing Q.

P, is a screw threaded nut engaging the screw threads on the inner surface of the cylinder N and acting to hold the annulus $p$ in position and in close engagement with the portion $q$ of the transmission shaft casing Q.

The end of the sleeve I which is toward the engine is provided with screw threads $i$ on its outer surface.

J, is a nut engaging the screw threads $i$ and serving to hold the sleeve K in position on the sleeve I. The cylindrical portion of the sleeve K forms a bushing for the cylinder M in which bushing the sleeve I is adapted to rotate.

R, is the casing for the equalizing gear which forms a portion of the casing for the rear axle $R^a$.

S, is a bevel gear wheel upon the end of the shaft G, and T, is a bevel gear wheel forming part of the driving gear with which the gear wheel S engages.

U and V are ball races on the end of the transmission shaft G.

W, is the cup having an end opening toward the rear axle and forming the corresponding way of the balls which engage in the ball race V.

X, is a cup having its end opening away from the rear axle and forming a corresponding part of the ball race U.

Y, is a set screw having a beveled inner end so located in a part of the casing Q, that its beveled end shall engage the sliding portion of the cup X to hold the same in position.

By the construction above described, I do away with the necessity of another bearing for the shaft C, and secure a compact and durable construction and one that may be easily assembled and taken apart. By the use of the single screw Y, the ball bearing is secured accurately in position.

What I claim is:—

1. The combination of a cylindrical bearing M, a cylindrical casing N, coaxial with the bearing M and inclosing the same, a sleeve K fitting within the bearing M and provided with an enlarged end toward the opening of the casing shaped to the zone of a sphere, a casing Q having a portion $q$ adapted to fit against the surface of the enlarged end of the sleeve K within the casing N, and means engaging the casing N and bearing against the portion $q$ of the casing Q for retaining the latter in engagement with the enlarged end of the sleeve K.

2. The combination of a cylindrical bearing M, a cylindrical casing N, coaxial with the bearing M and inclosing the same, a sleeve K fitting within the bearing M and provided with an enlarged end toward the opening of the casing shaped to the zone of a sphere, a casing Q having a portion $q$ adapted to fit against the surface of the enlarged end of the sleeve K within the casing N and means engaging the casing N and bearing against the portion $q$ of the casing Q for retaining the latter in engagement with the enlarged end of the sleeve K, and a universal joint constructed to form an arbor adapted to fit and rotate in the sleeve K.

In testimony whereof, I sign this specification in the presence of two witnesses.

CHARLES B. KING.

Witnesses:
LOTTA LEE BRAY,
ELLIOTT J. STODDARD.